United States Patent [19]
Anderson

[11] Patent Number: 4,836,345
[45] Date of Patent: Jun. 6, 1989

[54] CLUTCH SYSTEM FOR GEAR DRIVE

[75] Inventor: Richard N. Anderson, Owensboro, Ky.

[73] Assignee: Hunter Douglas Inc., Upper Saddle River, N.J.

[21] Appl. No.: 30,208

[22] Filed: Mar. 25, 1987

[51] Int. Cl.$^4$ .......................... F16D 43/20; E06B 9/36
[52] U.S. Cl. .................................... 192/20; 192/56 R; 74/405; 74/406; 160/166.1; 160/176.1; 160/900
[58] Field of Search .............. 192/20, 56 R, 79, 89 R, 192/89 W; 464/30, 37; 74/397, 399, 405, 406, 412 TA, 413, 421 R; 160/166 A, 176 R

[56] References Cited

U.S. PATENT DOCUMENTS

| | | | |
|---|---|---|---|
| 3,148,345 | 9/1964 | Moran | 74/406 X |
| 3,180,168 | 4/1965 | Harris | 74/406 X |
| 4,475,618 | 10/1984 | Kennedy et al. | 74/405 X |
| 4,478,313 | 10/1984 | Wakase | 74/406 X |

FOREIGN PATENT DOCUMENTS

| | | | |
|---|---|---|---|
| 1161356 | 1/1984 | Canada | 160/166 A |
| 2145141 | 3/1985 | United Kingdom | 160/166 A |

Primary Examiner—Rodney H. Bonck
Assistant Examiner—Richard M. Lorence
Attorney, Agent, or Firm—Pennie & Edmonds

[57] ABSTRACT

A clutch system for a gear drive particularly suitable for gear drives of vertical blinds having a movable gear which upon jamming of another gear moves radially to disengage the gears.

10 Claims, 5 Drawing Sheets

CLUTCH SYSTEM FOR GEAR DRIVE

BACKGROUND

The invention relates to gear drives and clutch systems therefor and in particular a clutch to prevent damage to a gear drive when one gear jams.

In gear drives, such as those usd in vertical blinds, a driving gear is rotated to rotate a driven gear. The driven gear is on the end of a shaft which positions the tilt of the slats of the blind. When the slats reach their most extreme tilt position in either direction, the shaft and the driven gear are stopped. At this point the operator will still be activating the driving gear, usually by a pull chain wrapped partially around the driving gear. If the operator continues to pull on the chain after the driven gear has stopped, damage may occur to the teeth of the driving gear and/or the driven gear.

It is known to protect a gear drive by use of an override coupling. For example, in a vertical blind each of the slat carriers may have a ratcheted connection to the tilt shaft so that when the salts jam or reach an extreme position the tilt shaft spins without jamming. Also, it is known to key the driven gear to its shaft with a key that will shear prior to the system obtaining a stress level which would damage the gears. In the first situation, no protection is afforded the gear drive if the shaft jams due to forces not applied to the slats. Furthermore, a failure in the ratchet of any one carriage's ratchet could damage the entire system. In the keyed type structure, the key must be replaced after each successful operation of the clutch.

SUMMARY OF THE INVENTION

It is an object of the present invention to provide a clutch system to override the intermeshing between a driving gear and driven gear to prevent damage when the driven gear is restrained from movement to a degree posing a possibility of damage to the gear drive. The invention is applicable to many types of gear drives, but will be described in connection with a vertical blind system.

The clutch system of the invention uses a slot shaped or oblong opening to mount one of the gears of the driving system. The longer dimension of the opening extends away from the center of rotation of the other gear. For example, if the driven gear is mounted to rotate about a fixed axis, then the driving gear is mounted to rotate with its shaft in the slotted opening. The driving gear can then move radially away from the driven gear when the driven gear jams. To provide for appropriate movement of the driving gear, the major axis of the slot may extend radially away from the driven gear. The driving gear is held in its engaged position during normal operatin by biasing means such as gravity, a spring or the forces driving the gear, i.e, the pulling forces on a pull chain.

The clutching effect can be made to require a greater force before disengagement. To increase the disengaging force, the major axis of the opening is brought closer to parallel to the pulling force on the driving gear. The force required to disengage the clutch can be lowered by positioning the opening's major axis farther from parallel with the pulling force. The teeth of the gears are advantageously provided with sloped or curved surfaces in order to assist moving the driving gear out of engagement. That is, on jamming, the faces of the teeth slide relative one another and thereby assist moving the gear.

DESCRIPTION OF THE PREFERRED EMBODIMENT

Figure 1:
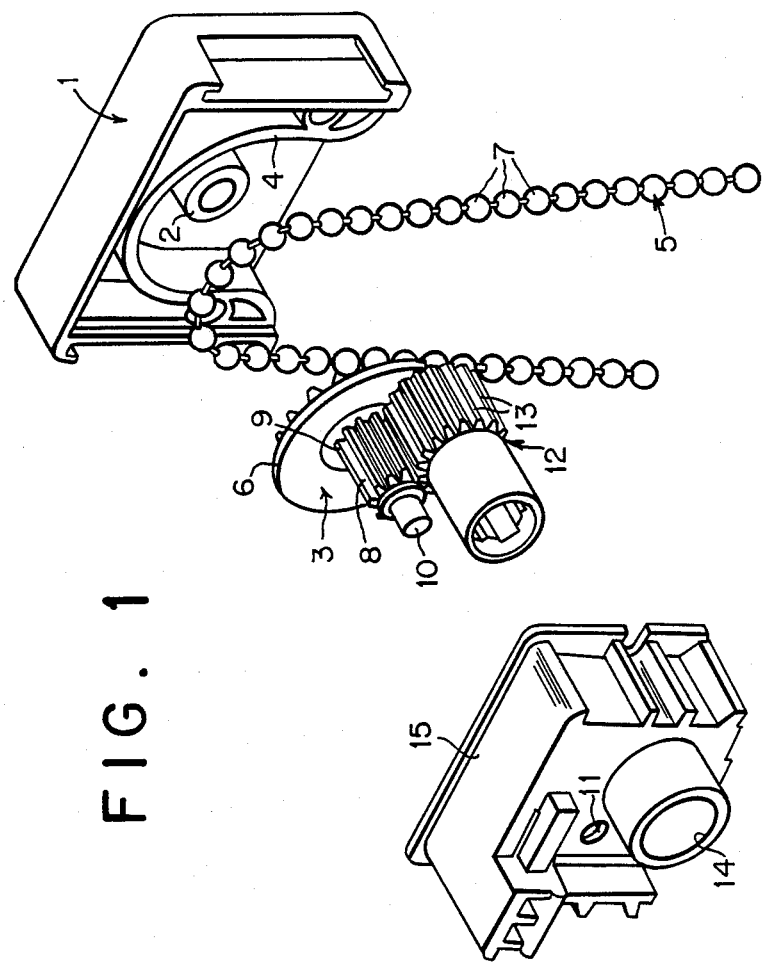
FIG. 1 is an exploded perspective view of the gear drive of a vertical blind incorporating the clutch system of the invention.
Figure 3:
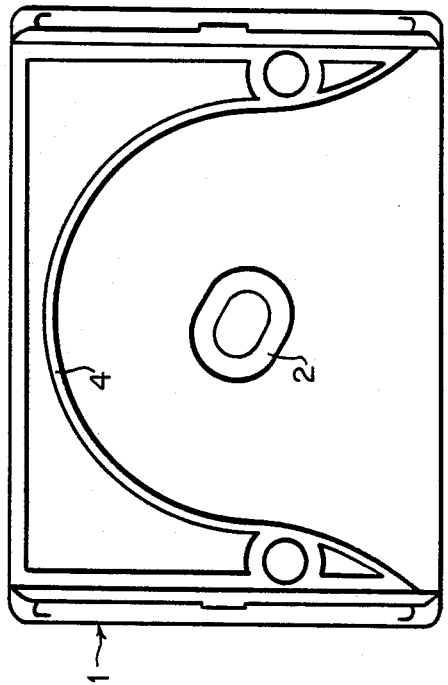
FIG. 3 is an end view of the end cap of the gear drive of FIG. 1.
Figure 2:
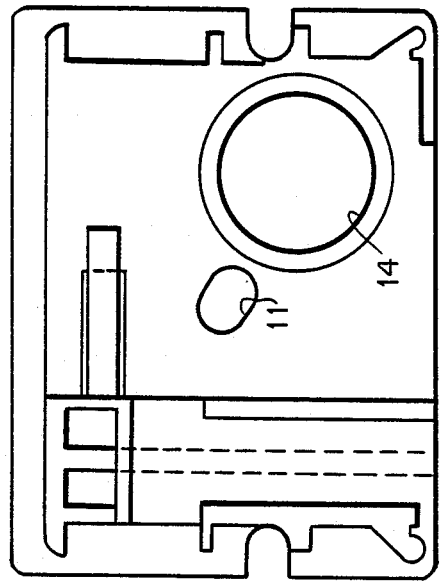
FIG. 2 is an end view of the housing of the gear drive of FIG. 1.

Referring to FIG. 1, there is shown an exploded view of a gear drive assembly incorporating the present invention. The gear drive depicted is that of a vertical blind; however, the clutching system may work in other applications. An outer housing in the form of end cap 1 is provided with a bearing 2 for receiving and mounting a portion of a shaft of driving gear 3. Bearing 2 is oval so that shaft mounted therein can move in the direction of the major axis of the oval (FIG. 2). Bearing 2 may, however, be any shape which permits movement of driving gear 3 away from its engaged position. End cap 1 also has a retaining wall 4 which acts to guide pull chain 5 as described below.

Driving gear 3 is a reduction gear having, at one end, a large diameter toothed portion 6. The teeth of portion 6 are spaced so as to receive the beads 7 of pull chain 5 therebetween. Retaining wall 4 acts to confine the beads 7 to spaces between the teeth of portion 6. Thus, when force is applied to either end of the pull chain, the driving gear 3 is rotated by the movement of pull chain 5.

Figure 5:
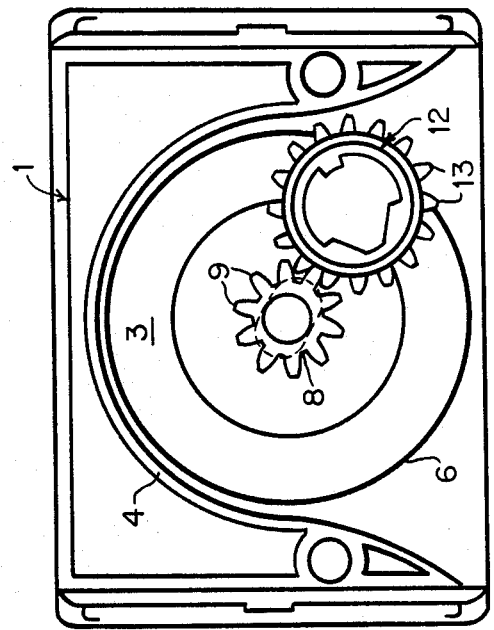
FIG. 5 is a cross-sectional view of the gear drive with the gears engaged.

At the end of driving gear 3 opposite the portion 6 is driving portion 8. Thus, it is easily seen that a reduction in gear diameter occurs between portion 6 and driving portion 8. The driving portion 8 has teeth 9 which extend parallel to the axis of rotation of the driving gear. Extending beyond teeth 9 is shaft portion 10 which is received in an oval bearing opening 11. Bearing opening 11 extends in the same direction as bearing 2. Thus, the shaft of driving gear 3 is mounted at each end in oval shaped openings which permit radial movement of the driving gear 3. The oval shape is preferred because it provides a complemental surface on which to seat the shaft of the driving gear when in its engaged position (FIG. 5).

Figure 4:
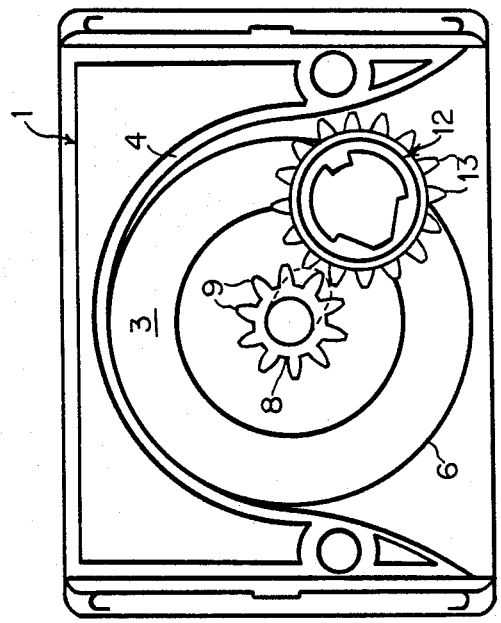
FIG. 4 is a cross-sectional view of the gear drive with the gears disengaged.

Driven gear 12 has driven teeth 13 which engage teeth 9 of the driving gear. Driven gear 12 is shown as the end gear of a tilt rod (not shown) for a vertical blind. The tilt rod passes through hole 14 defined by housing 15 to receive the driven gear 12 (FIG. 4). The hole 14 mounts the driven gear 12 so it rotates therein about a fixed axis. Thus, the driven gear 12 is fixed in position while the driving gear 3 is movable from a first position where teeth 9 engage driven teeth 13 to a second position where they are disengaged. It should be noted that it is not necessary that the driving gear move to a position where teeth 9 and driven teeth 13 are totally disengaged. It is sufficient if the driving gear moves to a position where the teeth will flex permitting the driving gear to spin without damaging the system.

Figure 6:
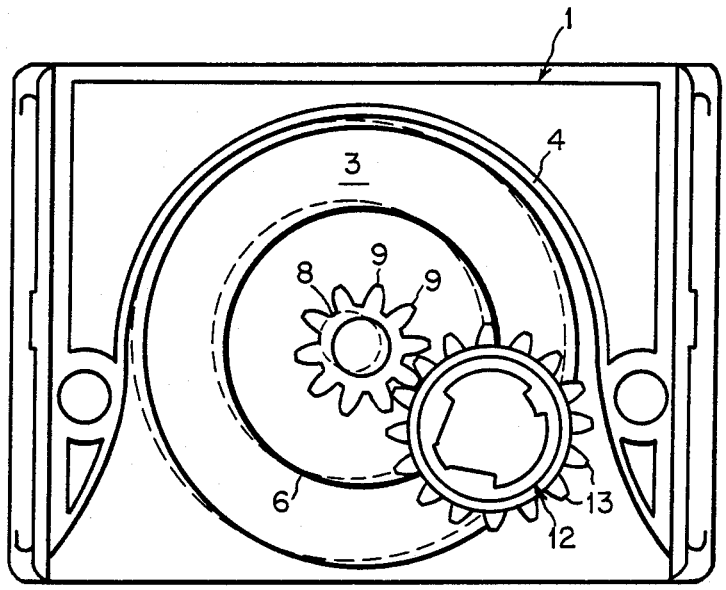
FIG. 6 is a cross-sectional view with the gears shown in both engaged and disengaged positions.
Figure 7:
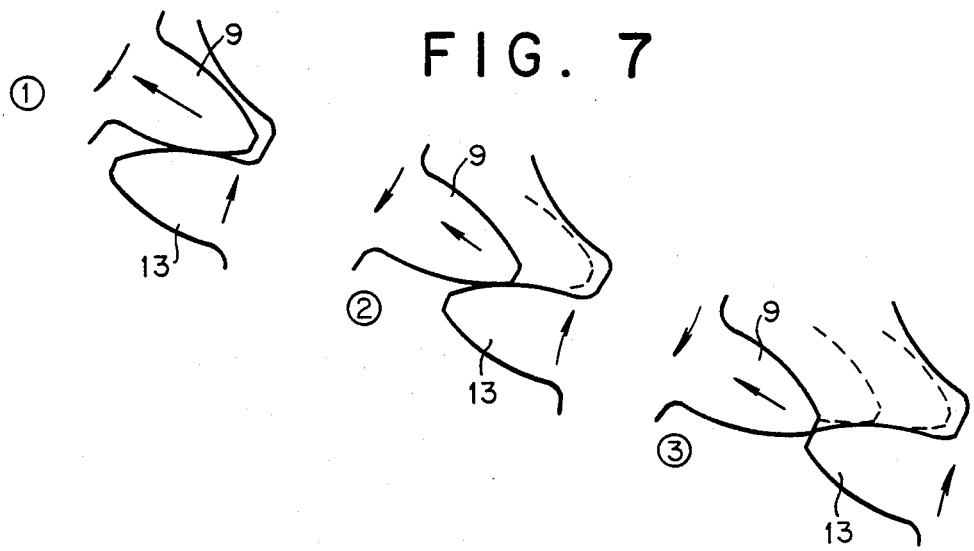
FIG. 7 is a schematic diagram showing the interrelationship of the gear teeth during clutching.

Referring to FIG. 6, there is shown a schematic depiction of an advantageous interaction of the teeth of the gears during clutching. When the driven gear 12 hits the end of its rotation or jams, driven teeth 13 will stop and be held in static position. As rotation of driving gear 3 causes teeth 9 to urge driven teeth 13 to rotate, a component of the force therebetween is in a direction urging teeth 9 outward. When that component is force becomes large enough to move driving gear 3, the driving gear slides to the disengaged position.

Figure 8:
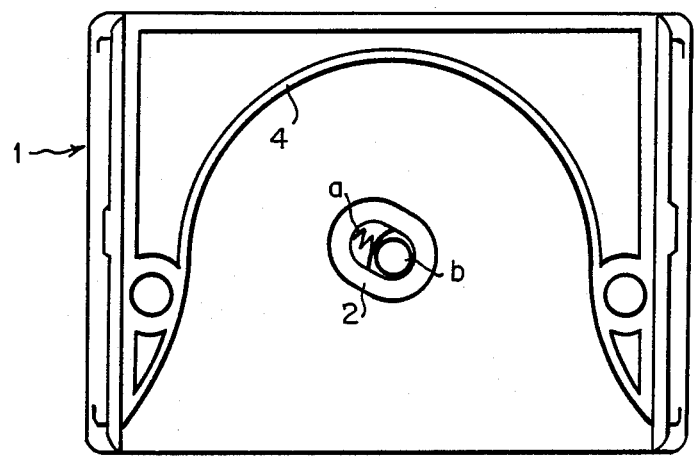
FIGS. 8 and 9 are end views of alternative embodiments of the end cap.

The force required to move the driving gear 3 can be changed by changing the direction the gear must move relative to the force applied to rotate the driving gear. For example the bearing 2 may be a slot extending directly up and down parallel to the pull chain. In that configuration the force to move the driving gear must also overcome a large portion of the pulling force on the chain. To reduce the force necessary to disengage the driving gear, the slot is positioned so its elongated dimension is closer to horizontal. In that position no portion of the force moving the driving gear is required to overcome the force of the pull chain. In the configuration shown if the slot extends much below horizontal then gravity will keep the driving gear in its second, disengaged position. However, a spring a may be positioned in the bearing to bias a shaft portion b of gear to the engaged position as shown in FIG. 8. The spring may also be used with the slot above horizontal in order to increase the required disengaging force.

Figure 9:
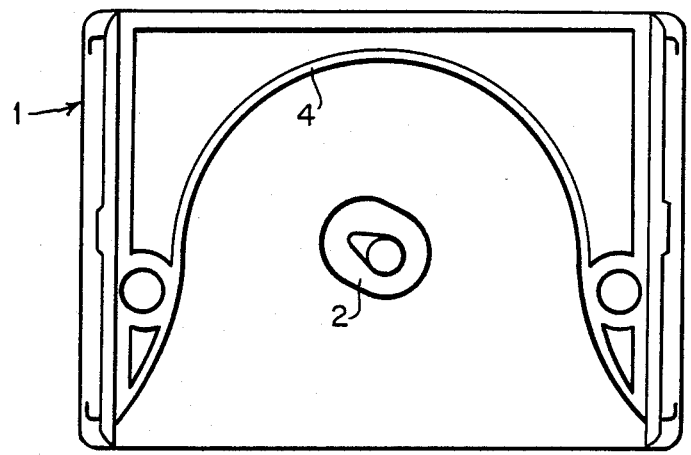

The required disengaging force may also be increased by tapering the slot in which the driving gear is mounted as shown in FIG. 9. As the slot constricts, it restrains the driving gear in its engaged position. The clutching or disengaging force could further be controlled by restricting the length of the slot so the teeth are not allowed to fully disengage, but instead are allowed to disengage to a point where they utimately flex, as described above, when the desired force level is reached thus causing the system to clutch.

I claim:

1. A clutch system for a gear drive, said clutch system being employed in a vertical blind system, the gear drive having a driving gear and a driven gear which is driven by said driving gear by engagement between the respective teeth of the two gears, each of said gears being rotatable about a respective axis, the clutch system comprising:
   (a) a first mount for rotatably supporting one of said gears for rotation about its axis;
   (b) a second mount for rotatably supporting the other of said gears for engagement with said one gear and for rotation about its axis, said second mount including:
   (i) slot means for supporting said other gear for movement along said slot means in a direction toward and away from said one gear and between a first position engaging said one gear and a second position where said gears are disengaged, the longitudinal axis of said slot means extending in a direction permitting sliding movement of the other gear away from said one gear when the respective teeth of the two gears are in driving engagement with each other;
   (c) biasing means for urging said other gear in one direction along said slot means and into said first position; and
   (d) means for rotating said other gear to produce a force urging said other gear along said slot means and towards said second position, said force being of sufficient magnitude to move said other gear toward said second position and out of engagement with said one gear when said one gear is maintained in a static position.

2. A clutch system according to claim 1 wherein:
   (a) said other gear is mounted with its axis above the axis of the one gear so gravity is the biasing means which holds said other gear in its first engaged position.

3. A clutch system according to claim 1 wherein:
   (a) said one gear is said driven gear; and,
   (b) said other gear is said driving gear.

4. The clutch system according to claim 1 wherein:
   (a) said second mount comprises an oval opening associated with one side of a housing and an oval bearing formation extending from an opposite end of said housing.

5. A clutch system according to claim 1 wherein:
   (a) said slot means further comprises a surface for supporting said other gear in said first position, said surface providing an area on which to rest a shaft associated with said other gear when said other gear is disposed in said first position.

6. A clutch system for a gear drive, the gear drive having a driving gear and a driven gear which is driven by said driving gear by engagement between the respective teeth of the two gears, each of said gears being rotatable about a respective axis, the clutch system comprising:
   (a) a first mount for rotatably supporting said driven gear for rotation about its axis;
   (b) a second mount for rotatably supporting said driving gear for engagement with said driven gear and for rotation about its axis, said driving gear having a portion for receiving a pull chain, said pull chain being in engagement with said portion so that a pulling force on said pull chain rotates said portion thereby driving said driving gear, said second mount including:
   (i) slot means for supporting said driving gear for movement along said slot means in a direction toward and away from said driven gear and between a first position engaging said driven gear and a second position where said driving and driven gears are disengaged, the longitudinal axis of said slot means extending in a direction permitting sliding movement of the driving gear away from said driven gear when the respective teeth of the two gears are in driving engagement with each other;
   (c) biasing means for urging said driving gear in one direction along said slot means and into said first position; and
   (d) means for rotating said driving gear to produce a force urging said driving gear along said slot means and toward said second position, said force being of sufficient magnitude to move said driving gear toward said second position and out of engagement with said driven gear when said driven gear is maintained in a static position.

7. The clutch system according to claim 6 including:
   (a) a housing defining said first and second mounts; and, (b) a retaining wall on said housing which retains said pull chain in engagement with said portion.

8. The clutch system according to claim 7 wherein:
(a) said driving gear has a stub shaft formation on each end which is received by a respective slot means.

9. A clutch system for a gear drive, the gear drive having a driving gear and a driven gear which is driven by said driving gear by engagement between the respective teeth of the two gears, each of said gears being rotatable about a respective axis, the clutch system comprising:
(a) a first mount for rotatably supporting said driven geaar for rotation about its axis;
(b) a second mount for rotatably supporting said driving gear for engagement with said driven gear and for rotation about its axis, said second mount including:
(i) slot means for supporting said driving gear for movement along said slot means in a direction toward and away from said driven gear and between a first position engaging said driven gear and a second position where said driving and driven gears are disengaged, the longitudinal axis of said slot means extending in a direction permitting sliding movement of the driving gear away from said driven gear when the respective teeth of the two gears are in driving engagement with each other, said slot means taper away from said driven gear and increasingly restrict the movement of said driving gear to said second position;
(c) biasing means for urging said driving gear in one direction along said slot means and into said first position; and
(d) means for rotating said driving gear to produce a force urging said driving gear along said slot means and toward said second position, said force being of sufficient magnitude to move said driving gear toward said second position and out of engagement with said driven gear when said driven gear is maintained in a static position.

10. The clutch system according to any one of the preceding claims wherein:
(a) said biasing means includes a spring to bias said other gear into engagement with said one gear.

* * * * *